United States Patent Office 3,452,602
Patented July 1, 1969

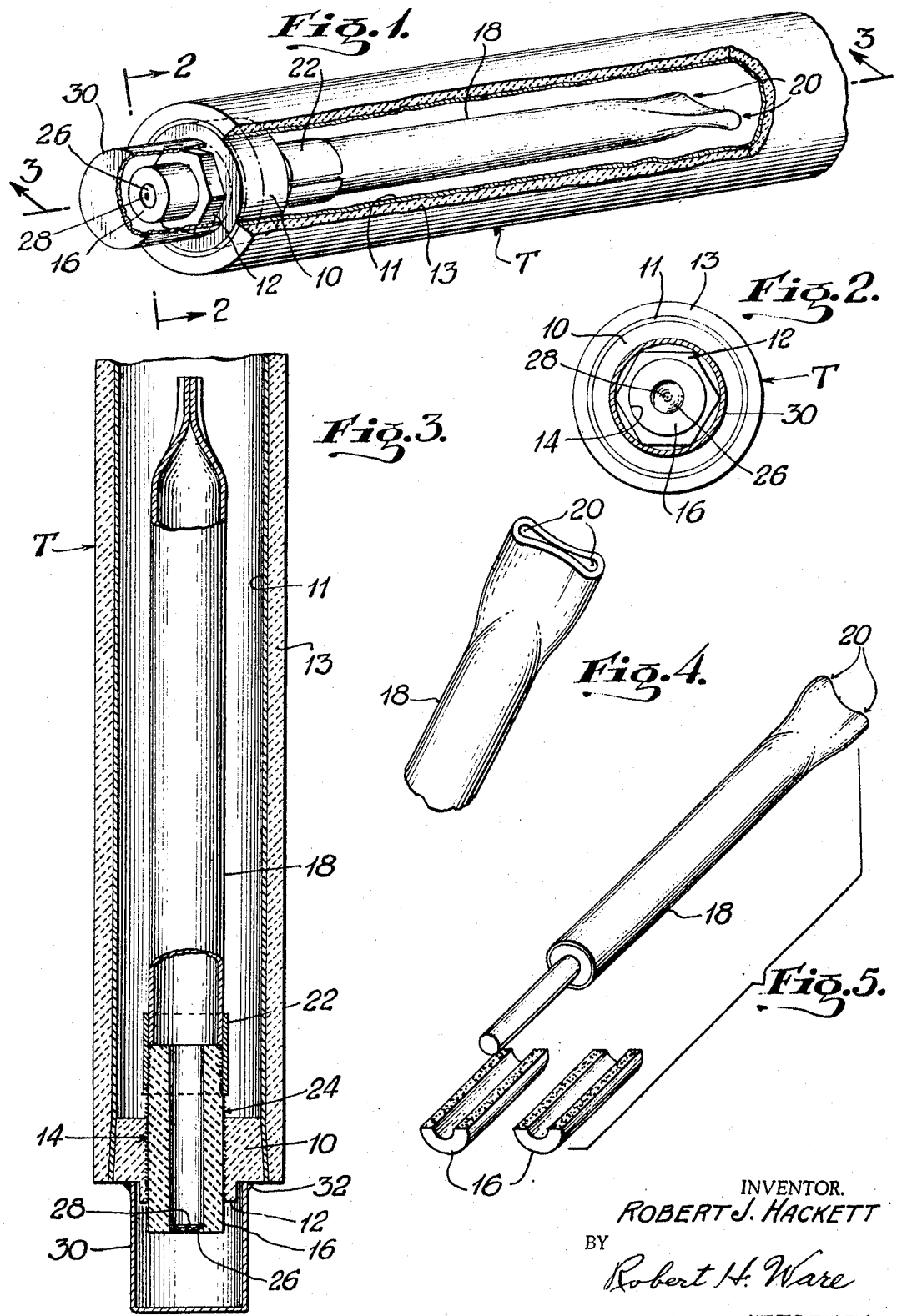

3,452,602
METAL SAMPLING DEVICE
Robert J. Hackett, Cross Road, Brookfield, Conn. 06804
Filed June 27, 1966, Ser. No. 560,724
Int. Cl. B41b *11/60;* G01n *1/12;* B28b *7/34*
U.S. Cl. 73—425.4                8 Claims

ABSTRACT OF THE DISCLOSURE

Molten metal sampling devices each incorporating a sampling tube of heat insulating ceramic material positioned by a support member preferably mounted in the exposed end of a ceramic covered heat resistant support tube, in combination with a tubular riser connected to one end of the sampling tube inside the support tube and having reduced-area vent means formed in the opposite end of the riser tube, and cap means associated with the exposed end of the sampling tube and positioned to divert slag and retard the entry of molten metal into the sampling tube and the riser tube for a short period after the plunging immersion of the assembly beneath the surface of a body of molten metal.

---

This invention relates to a metal sampling device and, more particularly, to such a device for sampling metal while it is in the molten state.

It is often desired in the metal industry to obtain samples of a metal at various stages during its production in order to closely control the quality of the finished product. For example, the analysis of molten metal samples removed from an operating furnace may be employed to determine the necessary additions to the mix which are required to produce a metal of the desired quality and composition. Furthermore, sampling during various stages of degasification would permit the determination of the effectiveness of the procedure. However, the accurate sampling of molten metal is extremely difficult and has been relatively unsuccessful. This is particularly true in the case of the basic oxygen furnace now widely used in the steel industry. It is not possible to insert a ladle directly into the metal in such a furnace because it has a single top opening. Accordingly, in the past it has been necessary to tilt a furnace weighing many tons in order to remove a small sample for analysis. In other types of furnaces even this has been impossible and no sampling was possible until an ingot had been poured. After cooling, a section of the ingot was removed and machined for analysis. Furthermore, the floating slag layer often prevents the obtaining of a true sample of the underlying metal.

In addition to such "mechanical" difficulties it has heretofore been virtually impossible to obtain samples from molten metal for analysis of oxygen and other gases. This requires the determination of 16–35 parts per million and previous sampling techniques often introduced contamination ruining the sample. Contamination of a sample may arise from any of three sources: the slag layer on the surface of the molten metal, atmospheric contamination or the materials employed in the sampler itself.

A pin sample is most often obtained for laboartory inspection and freedom from contamination is of paramount importance. From a sample of approxmiately one gram an oxygen analysis is made and the result deemed to be representative of possibly 100,000 pounds of metal. Samples must be accurate within the limits of error of the gas analyzer and must be reproducible.

Another type of problem which has arisen in past attempts to produce a sampling device is related to the rate at which the sample is cooled. If the steel or other molten metal is cooled too rapidly as its enters the device, the metal may either cool in layers, causing stratification of the sample pin, or the pin may be nothing more than a mass of semi-fused droplets. In addition, there are important metallurgical factors to be considered which relate to the type of steel or other metal being sampled. If the alloy is a hardenable type, usch as a tool steel, rapid cooling gives the same result as quenching and the pin has the characteristics of hardened tool steel. Since the pin must be prepared for laboratory analysis by removing surface oxides and polishing, such a sample is hard to prepare. While the prior art has been able to solve some of these problems as they pertain to the sampling of specific alloys, it has been unable to provide a sampler which is capable of making accurate samples of a number of different alloys and provide for slow or fast cooling.

Accordingly, it is a primary object of the present invention to provide an improved molten metal sampling device. Other objects are to provide such a device which may be readily and easily handled by a single workman; which takes a sample of molten metal from below the overlying slag; which permits the taking of a sample from directly overhead through the top surface of the melt in either a furnace or a ladle; which cools the molten sample at a relatively slow rate; and which produces accurate and uniform samples of desired configuration for analysis.

The objects of this invention are achieved by means of a molten metal sampling device which comprises a support member retaining a sampling tube of heat insulating ceramic which has a first and a second end. A riser has a first end in fluid flow relationship with the second end of the sampling tube. A metallic first cap closes the first end of the sampling tube and a second cap encloses the first end of the sampling tube but is spaced from the first cap.

A specific embodiment of this invention which achieves the objectives set forth above will now be described, particular reference being had to the drawings wherein:

FIG. 1 is a side view of the sampler of this invention, partially in cross section to illustrate its internal construction;

FIG. 2 is a bottom end view of the sampler of FIG. 1;

FIG. 3 is a cross section taken substantially along the line 3—3 of FIG. 1;

FIG. 4 illustrates the upper end of the riser tube of the invention; and

FIG. 5 is an illustration showing the manner in which the sample pin may be removed.

In FIGS. 1 and 2 the sampling device is illustrated as being mounted within the end of a heat resistant support tube T. Tube T retains a volume of air around the sampling device after immersion into the melt. Various types of tube construction may be employed. In the illustrated embodiment, it comprises a steel tubular liner 11 having a ceramic coating 13 bonded thereto. The ceramic coating is substantially free of water and organics and will withstand immersion into molten metal for a time sufficient to permit the sampling device to function. This tube, in turn, may be mounted on the end of a suitable pipe or lance for manipulation by an operator.

The sampling device itself comprises a support member 10 which is constructed of ceramic (such as a standard refractory mix) in the form of a tapered plug. The taper permits the sampling device assembly to be frictionally retained in the end of the tube T. The lower face of the support member 10 carries a raised round or hexagonal boss 12 and a hole 14 extends along the central axis of the support member. Mounted within the hole 14 is a ceramic sampling tube 16 which has an internal diameter equal to the desired sample pin diameter. Certain factors require consideration in the selection of the material for sampling tube 16. In order to prevent foreign matter from mixing with the metal entering the sampler, the tube should be highly resistant to thermal shock and not spall, shatter, melt, fuse or gas—even upon immersion into molten metals at temperatures of 3,000° F.

Secondly and most important, the ceramic must be an insulator rather than a conductor of heat. Some ceramics get their thermal shock capabilities from their ability to heat completely through very quickly and thus release the strains that cause cracking. However, as set forth above, it is desirable not to cool the entering metal too rapidly so that this type of ceramic would not be desirable. The preferred ceramics for this application are zirconium oxide, fused silica or other nonconducting materials. Of these, zirconia appears to be the most suitable and is preferred in this application. It has one of the lowest thermal conductivity factors and in addition has excellent thermal shock capabilities. It is not wetted by metals and its melting point is 4,800° F.—well above steel temperatures.

It will be noted that the zirconia tube 16 extends beyond the boss 12 on the lower face of support member 10. Mounted against the upper end of the sampling tube 16 is the end of a metal riser tube 18. The riser tube 18 is of thin walled steel and, at its upper end, is flattened in such a manner as to substantially close it while leaving a pair of vents 20. The riser tube 18 and the sampling tube 16 may be joined by any siutable means such as the spring bushing 22. A ceramic cement 24 is applied between the support member 10 and the spring bushing 22 to the sampling tube 16, as shown in FIGS. 1 and 3.

The lower end of the sampling tube 16 is closed by a small internal steel cap 26. The cap 26 is convex as seen from outside the tube end. It may be installed by positioning it on the end of a metal rod slipped inside the tube 16 and then dimpling it as at 28 by a suitable tool. This expands it sufficiently to frictionally engage the bore of the sampling tube 16. A thin aluminum outer cap 30, which is generally cup shaped, is mounted to enclose the open end of the sampling tube 16 by fitting to the round or hexagonal boss 12. A small amount of ceramic cement 32 may be added for additional strength.

Although the dimensions of the sampler may be varied to suit the application, one arrangement which has proved useful in actual operation employs a support member 10 of 1.125 inches average outside diameter and having a one-half inch hole. The sampling tube 16 is approximately one and one-half inches in length, has an outside diameter of one-half inch, and an inside diameter of one-quarter inch. The end of the sampling tube extends approximately three-eights inch beyond the face of the support member 10. The steel riser tube 18 is approximately six inches in length and has a wall thickness of .020 inch and an outside diameter of one-half inch. The inner cap 26 is .015 inch steel and the outer cap 30 is .012 inch aluminum. The distance between the end of sampling tube 16 and the flat surface of outer cap 30 is approximately five-eights inch. The tube T must be sufficiently long to permit complete penetration of the slag layer by the sampling device.

*Operation*

In use, the sampling device mounted at the end of the tube T at the end of a lance or pipe of appropriate length is plunged into the molten metal and held in position for approximately six to ten seconds. The exact functioning of cap 30 is not known but it is believed that upon the initial contact of the aluminum cap with the slag, the aluminum converts very rapidly to gas and this gas layer allows the sampling tube 16 to slide through the slag without the slag adhering to the inner cap 26. It is important to keep slag away from the steel cap because slag cools very rapidly and may actually insulate the steel cap from the melt and thus prevent the molten metal from running up the tube. Furthermore, if the steel cap were to only partially melt away, the slag particles on the remainder of the cap would show up in the sample.

After the aluminum cap melts, the molten metal reaches the sampling tube 16 which is closed by inner cap 26. By this time, agitation from the conversion of solid aluminum into gas has been left behind and molten steel has again reoccupied the area. The steel inner cap 26 now melts away and the hydrostatic pressure of the molten metal forces the metal to flow upwardly through sampling tube 16 and into riser tube 18. There are several reasons for having the end of the sampling tube 16 protrude beyond the support member 10. If there is agitation in the vicinity of the support member and the tube is flush-ended, bubbles are apt to show up in the sample. Furthermore, if the material of the support member spalls or melts, it would also show up in the sample. By allowing the tube to protrude, it is possible to use less expensive materials for the support member 10 than for sampling tube 16 while still avoiding contamination.

In order to get optimum samples, particularly from the very viscous high chrome steels, it is desirable to fill the entire volume of the riser tube 18 before the metal solidifies. The viscous steels may go from liquid to solid in fractions of a second when working with small volumes. For this reason, the sampling tube 16 is made of an insulating ceramic, such as the zirconia disclosed above. This prevents the steel from cooling rapidly and solidifying as it enters the sampling tube. The molten steel fills the sampling tube 16 and continues to flow into the riser tube 18. Entrapped air within the riser passes out vents 20 and is thus prevented from diffusing through the sample, and forming bubbles which would give an inaccurate analysis. Since the primary concern is to obtain a sample of the molten metal, it is necessary to rid the ultimate sample of the metal from the steel inner cap 26. As the volume in riser tube 18 is several times the volume of sampling tube 16, any contaminated metal resulting from the melting of cap 26 runs up into the riser and pure metal occupies the passage within sampling tube 16.

Cooling rates are a factor not only in the design of the sampling tube 16 but also in the design of riser tube 18. If the wall of the riser tube 18 is too thick, the resultant chilling will solidify the steel before the riser is full. If the riser does not fill, contaminated metal will remain in the pin area. In addition, if the metal cools too fast and hardenable alloys are being sampled, the pin will then be too hard for laboratory analysis. In effect, the thin wall steel tubing employed in this invention for the riser tube 18 permits air cooling of the steel contained within by the air volume enclosed by tube T. Thus the cooling rate is relatively slow and the metal solidifies from the top down. It will be remembered, however, that this takes place within a time span of eight to ten seconds.

After the sampling device is removed from the molten metal, it is allowed to cool, removed from the support tube T, and the ceramic surrounding the newly formed pin P is fractured as shown in FIG. 5. The surface of the pin is smooth and, because it has cooled slowly in air, it is oxidized. To make a laboratory analysis, the oxidation is removed after cutting or snapping the pin from the riser. This is most usually done by means of a lathe.

It will now be apparent to those skilled in the art that the present invention provides a novel and useful device for securing samples of molten metal. It will also be apparent that a number of variations and modifications may be made therein without departing from its spirit and scope. Accordingly, the foregoing description is to be construed as illustrative only, rather than limiting. This invention is limited only by the scope of the following claims:

What I claim as new and desire to secure by Letters Patent of the United States is:

1. A molten metal sampling device which comprises: a support member; a sampling tube of heat insulating ceramic retained by said support member and having a first and a second end; a tubular metal riser having a first end in fluid flow relationship with the second end of said sampling tube and a substantially closed second end defining an air vent therethrough; first metallic cap means closing the first end of said sampling tube; and second cap means enclosing the first end of said sampling tube but spaced from said first cap means.

2. The sampling device of claim 1 wherein said support member includes a heat resistant tube surrounding, and spaced from, said riser.

3. The sampling device of claim 1 wherein said second cap means is aluminum.

4. The sampling device of claim 1 wherein said heat insulating ceramic is selected from the group consisting of zirconium oxide, mullite, and fused silica.

5. The sampling device of claim 1 wherein said heat insulating ceramic is zirconia.

6. The sampling device of claim 1, including a heat resistant support tube having one end insertable into a body of molten metal; a ceramic support member closing said one end and defining an opening substantially aligned with the longitudinal axis of said tube; a ceramic sampling tube positioned in the opening of said support member and including a first end extending outwardly from said support member and support tube and a second end extending inwardly from said support member within said support tube; a metal riser tube positioned internally of said support tube, said riser tube having a first end secured in fluid flow relationship with the second end of said sampling tube and a closed second end defining an air vent therein; a metal first cap closing the first end of said sampling tube; and an aluminum second cap enclosing the first end of said sampling tube but spaced from said first cap.

7. The sampling device of claim 6 wherein said sampling tube is zirconia.

8. The sampling device of claim 7 wherein said riser tube and said first cap are of steel.

References Cited
UNITED STATES PATENTS

| | | | |
|---|---|---|---|
| 2,485,492 | 10/1949 | Hubbard et al. | 164—4 X |
| 3,357,250 | 12/1967 | Lowdermilk | 164—4 X |
| 3,369,406 | 2/1968 | Lowdermilk et al. | 73—421 |

J. SPENCER OVERHOLSER, *Primary Examiner.*

EUGENE MAR, *Assistant Examiner.*

U.S. Cl. X.R.

164—4; 249—62, 164